United States Patent [19]

Iio et al.

[11] 4,374,098
[45] Feb. 15, 1983

[54] METHOD OF CONCENTRATING SILVER FROM ANODE SLIME

[75] Inventors: Toshimasa Iio; Toyokazu Ohkubo, both of Niihama, Japan

[73] Assignee: Sumitomo Metal Mining Co., Ltd., Tokyo, Japan

[21] Appl. No.: 388,986

[22] Filed: Jun. 16, 1982

[30] Foreign Application Priority Data

Jun. 22, 1981 [JP] Japan .................................. 56-96215

[51] Int. Cl.$^3$ .............................................. C01G 21/20
[52] U.S. Cl. ......................................... 423/27; 423/34; 423/95; 423/98; 75/99
[58] Field of Search ................. 75/118 R, 99; 423/95, 423/98, 27, 38, 35, 45, 46, 34

[56] References Cited

U.S. PATENT DOCUMENTS 4,094,668  6/1978  Yannopoulas et al. ................. 75/99

OTHER PUBLICATIONS

Safanov, V. V. Lyatkina et al. Tv. "Mosle Khim-Tekknol Inst. 1969, 161-164 (Russ) abstracted in Chem. Abs. vol. 75 93960z.

Habashi, Fathi *Principles of Extractive Metallurgy* vol. II, 1970.

Primary Examiner—O. R. Vertiz
Assistant Examiner—Robert L. Stoll
Attorney, Agent, or Firm—Watson, Cole, Grindle & Watson

[57] ABSTRACT

A method of concentrating silver from anode slime which comprises reacting an intermediate product obtained by treatment of the slime, the intermediate product containing lead in sulfate form and silver in chloride form, with an aqueous solution of an alkali hydroxide or carbonate. The obtained reaction product is then subjected to solid-liquid separation, and the resulting residue is reacted with a nitric acid solution so that the lead therein may be separated into a filtrate, while the silver will remain in the residue.

4 Claims, No Drawings

METHOD OF CONCENTRATING SILVER FROM ANODE SLIME

BACKGROUND OF THE INVENTION

1. FIELD OF THE INVENTION:

This invention relates to a method of treating the anode slime which is generated during electrolytic copper refining, and more particularly, to a method of treating an intermediate product which is obtained from the anode slime so as to separate the silver from the lead therein.

2. DESCRIPTION OF THE PRIOR ART:

Anode slime generated during electrolytic copper refining consists mainly of the impurities in the crude copper used as the anode which are insoluble in the electrolyte. The slime, which settles to the bottom of the electrolytic tank or onto the crude copper, contains many valuable metals such as gold, silver, selenium, tellurium, lead, and metals of the platinum group, as well as a large quantity of copper.

Many methods have hitherto been employed for recovering these valuable metals from the anode slime. Although these methods differ from one another to some extent, they generally include the steps of copper and selenium removal, smelting, volatilization, cupellation, silver electrolysis, and gold electrolysis.

These prior art method, however, require a high temperature, i.e., at least 1,000° C., for smelting, and they also necessitate the treatment of the exhaust gas. For example, the sulfur dioxide exhaust produced by desulfurization must be neutralized with an alkali. Cupellation also requires a high temperature, i.e., at least 1,000° C., and it requires a large amount of thermal energy to oxidize a large quantity of the lead and to separate the lead from the valuable metals to be recovered, particularly the noble metals. Moreover, a large quantity of silver will remain in almost all steps since it is recovered only just prior to the final step of the whole process. Since a long time is required for each of the various steps involved, i.e., from one to five days, and since silver is carried forward from one step to another, a period of at least one to two weeks is usually required between smelting and cupellation. The remaining of silver is further increased by the unavoidablly repeated treatments of the matter and slag in which silver is contained during smelting and of the litharge in which silver is contained during cupellation.

There are also other known methods of concentrating silver from anode slime which is generated during electrolytic copper refining or from an intermediate treatment product thereof. For example, Japanese Laid-Open Patent Specification No. 145321/79 proposes the treatment of such an intermediate product with dilute nitric acid to extract the silver therefrom. This method is, however, applicable only to an intermediate product which contains lead in the form of lead sulfate and silver in the form of metallic silver, silver oxide, silver carbonate or the like, these materials being easily leachable in dilute nitric acid. It is inappropriate if the silver is in the form of silver chloride.

Japanese Patent Pablication No. 9130/79 discloses a method which comprises forming a slurry of anode silime directly in a highly concentrated solution of hydrochloric acid, adding chlorine gas with stirring to chlorinate the slime, and leaching the resulting silver-rich chlorinated residue in hot water (e.g., acidified water) to thereby remove the greater part of the lead chloride existing in the residue. This method is, however, applicable only to the slime containing lead in the form of lead chloride, and inappropriate if the lead is in the form of lead sulfate.

It is an object of this invention to eliminate the aforesaid drawbacks of the methods known in the art and to provide a wet metallurgical method which enables silver chloride in anode slime to be effectively separated from the lead in sulfate form at an early stage and to be easily concentrated, thereby providing a high yield.

SUMMARY OF THE INVENTION

According to this invention, there is provided a method of concentrating silver from anode slime which comprises reacting an intermediate product obtained by treatment of the anode slime, the intermediate product containing lead in sulfate form and silver in chloride form, with an aqueous alkali hydroxide or carbonate solution; then subjecting the obtained reaction product to solid-liquid separation; and thereafter reacting the resulting residue with a nitric acid solution, the obtained residue containing almost all of the silver and the filtrate containing almost all of the lead.

DETAILED DESCRIPTION OF THE INVENTION

The various constituents of anode slime take complicated forms, including some which have not yet been identified. It is, however, generally known that the slime contains lead in the form of lead sulfate and silver in the form of metallic silver, silver selenide or silver telluride. In order to recover silver at an early stage in accordance with the method of this invention, it is necessary that the slime contain lead in the form of lead sulfate and silver in the form of silver choride. Therefore, the method of this invention employs an intermediate product obtained by suitably treating the initial anode slime.

With regard to the foregoing, an intermediate product which contains lead in the form of lead sulfate and silver in the form of silver chloride can be, for example, obtained as a gold extraction residue after the slime is subjected to treatments for copper and selenium removal, and gold removal by wet chlorination. The removal of copper and selenium may be accomplished by customary methods as will hereunder be described by way of example.

According to one method, slime is treated in a vessel having normal atmospheric pressure, or else a high temperature and high pressure, with dilute sulfuric acid in the presence of air or oxygen, or else with concentrated sulfuric acid. The slime is thereafter extracted with water so that the copper may be dissolved in the extract (copper removal), and the resulting residue is then subjected to oxidative roasting at temperature of 600° C. to 800° C. so that the selenium may be volatilized in the form of selenium dioxide (selenium removal).

According to another method, the anode slime is treated with an acid or alkali in the presence of air or oxygen in an autoclave having a high temperature and a high pressure. The acid treatment employs a high temperature than the aforesaid method using sulfuric acid, and it enables simultaneous dissolution of the copper and selenium. According to the alkali treatment, selenium is dissolved in an alkali (selenium removal), and the copper is extracted from the residue with dilute sulfuric acid (copper removal).

Still another known method comprises subjecting slime to oxidative roasting in the presence or absence of concentrated sulfuric acid so that selenium may be volatilized in the form of selenium oxide (selenium removal), and then extracting the roasted product with water or dilute sulfuric acid to remove the copper.

There is known a further method developed by the inventors of this invention, and disclosed in Japanese Patent Application No. 148506/80, filed Oct. 23, 1980, and entitled "Method of Treating Electrolytic Copper Refining Slime". This method comprises removing free sulfuric acid from the slime to the maximum possible extent, reacting an aqueous slurry of the slime with air or oxygen in a vessel having a high temperature and high pressure to convert the copper and selenium to acid-soluble salts, and then extracting the salts with sulfuric acid to remove the copper and selenium.

The removal of gold by wet chlorination may be accomplished by the method disclosed in our U.S. application Ser. No. 317,640, filed Nov. 2, 1981, and entitled "Method of Recovering Gold from Anode Slimes." According to this method, the slime from which copper and selenium have been removed is formed into an aqueous slurry, and then chlorine gas is blown into the slurry to dissolve the gold in the liquid.

The intermediate product thus obtained contains lead in the form of lead sulfate and silver in the form of silver chloride. In order to enable the silver chloride to remain in the residue and the lead to be dissolved in the extract by a wet process, the lead sulfate is converted to lead hydroxide or carbonate, which is soluble in nitric acid. For this purpose, the intermediate product is reacted with an alkali such as sodium hydroxide or sodium carbonate as follows:

$$PbSO_4 + 2NaOH \rightarrow Pb(OH)_2 + Na_2SO_4$$

$$PbSO_4 + Na_2CO_3 \rightarrow PbCO_3 + Na_2SO_4$$

The intermediate product is added to water in a stirring tank to form an aqueous slurry usually having a concentration of 100 to 600 grams per liter. At least a stoichiometric quantity of an alkali, or usually 1.1 to 1.2 times as much alkali as lead, may then be added into the slurry. If a caustic alkali is employed, its quantity should not greatly exceed the range mentioned above. If its quantity is excessive, it is not only a waste of the alkali, but also the alkali is likely to react with the silver chloride to form silver oxide, which is soluble in nitric acid, as shown by the following formula by way of example:

$$2AgCl + 2NaOH \rightarrow Ag_2O + 2NaCl + H_2O$$

The formation of silver oxide undesirably complicates the subsequent recovery of the silver. It is preferable to employ a reaction temperature not exceeding 40° C., i.e., since a higher temperature is likely to result in the formation of silver oxide. The reaction may be completed within an hour.

The reaction product of the slurry is subjected to solid-liquid separation. As is obvious from the foregoing description, the sulfate radical in the lead sulfate is separated in the form of an alkali sulfate in the liquid and the lead in the lead sulfate in the form of lead hydroxide or carbonate in the residue (desulfurization residue). Silver chloride remains unreacted in the residue. The alkali sulfate may be thrown away after its pH has been adjusted with an acid-containing solution.

The desulfurization residue containing a nitric acid-soluble lead compound and silver chloride is, then, treated with a nitric acid solution in a stirring tank so that lead may be extracted, i.e., as follows:

$$Pb(OH)_2 + 2HNO_3 \rightarrow Pb(NO_3)_2 + 2H_2O$$

$$PbCO_3 + 2HNO_3 \rightarrow Pb(NO_3)_2 + H_2O + CO_2$$

While a stoichiometric quantity of nitric acid may be added, it is necessary to supply at least a sufficient quantity of water to dissolve the lead nitrate. It is, therefore, advisable to employ dilute nitric acid. The reaction may be completed within an hour.

The reaction enables at least 90% of the lead to be dissolved in the liquid, while the silver remains undissolved in the form of silver chloride. The dissolution of silver is, however, likely to occur if silver oxide exists as a result of the use of an excessive quantity of the caustic alkali, or of too high reaction temperature to maximize the dissolution of the lead. Normally, only 0.01 to 0.9% of the silver is dissolved. Although small quantities of copper, bismuth, etc., are also dissolved in the nitric acid solution, they are nobler metals than lead, and can, therefore, be separated easily from the liquid if cementation is performed by using a metallic lead plate, or the like. The lead nitrate solution is, then, reacted with sulfuric acid as follows so that the lead may be recovered in the form of lead sulfate, while nitric acid is also recovered to form a regenerated nitric acid solution which can be reused for above-mentioned nitric acid treatment:

$$Pb(NO_3)_2 + H_2SO_4 \rightarrow PbSO_4 + 2HNO_3$$

The residue (nitric acid extraction residue) contains silver concentrated in the form of silver chloride. The residue can be refined by various known methods. For example, it is possible to form crude metallic silver by adding iron plate or powder to the reside in an acid solution such as hydrochloric acid, or reacting the residue with sodium carbonate in accordance with a dry process, and to refine the crude silver by oxidation in order to form a silver anode for silver electrolysis.

The invention will now be described more specifically with reference to several examples thereof.

EXAMPLE 1

Selenium was removed from anode slime by oxidative roasting, and the roasted product was extracted with dilute sulfuric acid to remove copper. The extraction residue in an aqueous slurry was reacted with chlorine gas, whereby gold was dissolved in the solution. The gold extraction residue contained 38.0% Pb, 15.9% Ag, 5.9% S, 5.3% Cl, 1.98% Bi, 1.25% Cu and 0.0100% Pd, all by weight. A slurry was formed from 600 g of the residue and 1.5 liters of an aqueous solution containing 97 g of sodium hydroxide. Reaction was performed at ordinary room temperature for an hour with stirring. The desulfurization residue obtained as a result of the reaction was filtered, washed with water, and filtered again. The whole residue remaining wet was, then, formed into a slurry in 1.5 liters of an aqueous solution containing 255 g of 62% by weight concentrated nitric acid. The slurry was allowed to react at room temperature for an hour with stirring. The quantities of the extract and extraction residue thus obtained, their chemical analysis, and the extraction ratio are shown in TABLE 1.

TABLE 1

|  | Quantity | Chemical Analysis | | | | |
|---|---|---|---|---|---|---|
|  |  | Pb | Ag | Bi | Cu | Pd |
| Nitric acid* extract | 2.06 lit. | 108 g/lit. | 0.3 g/lit. | 0.93 g/lit. | 0.32 g/lit. | 11 mg/lit. |
| Extraction residue | 263 g | 2.00% | 35.8% | 3.74% | 2.58% | 124 g/t |
| Extraction ratio | — | 97.7% | 0.65% | 16.3% | 8.8% | 41.0% |

*Contains the water used for washing the residue.

The extract was placed in a 200 ml beaker, and after a lead plate was put therein, the solution was subjected to cementation for 30 minutes under stirring. As a result, there was obtained a solution containing 0.8 mg of Ag, less than 1 mg of Bi, less than 0.5 mg of Cu, and 0.5 mg of Pd, per liter.

EXAMPLE 2

The procedures of EXAMPLE 1 were repeated, except that 1.5 liters of an aqueous solution containing 108 g of sodium hydroxide were employed for desulfurization of the gold extraction residue. The quantities of the extract and extraction residue thus obtained, their chemical analysis, and the extraction ratio are shown in TABLE 2.

TABLE 2

|  | Quantity | Chemical Analysis | | | | |
|---|---|---|---|---|---|---|
|  |  | Pb | Ag | Bi | Cu | Pd |
| Nitric acid* extract | 1.84 lit. | 119 g/lit. | 1.1 g/lit. | 2.04 g/lit. | 0.43 g/lit. | 14 mg/lit. |
| Extraction residue | 252 g | 3.23% | 36.9% | 3.06% | 2.64% | 119 g/t |
| Extraction ratio | — | 96.4% | 2.1% | 32.7% | 10.6% | 46.2% |

*Contains the water used for washing the residue.

COMPARATIVE EXAMPLE 1

The procedures of EXAMPLE 1 were repeated, except that the desulfurization of the gold extraction residue was performed at a temperature of 80° C. The quantities of the extract and extraction residue thus obtained, their chemical analysis, and the extraction ratio are shown in TABLE 3.

TABLE 3

|  | Quantity | Chemical Analysis | | | | |
|---|---|---|---|---|---|---|
|  |  | Pb | Ag | Bi | Cu | Pd |
| Nitric Acid* extract | 2.04 lit. | 105 g/lit. | 3.3 g/lit. | 0.85 g/lit. | 0.33 g/lit. | 11 mg/lit. |
| Extraction residue | 261 g | 5.40% | 33.8% | 3.84% | 2.60% | 124 g/t |
| Extraction ratio | — | 93.8% | 7.1% | 14.7% | 9.0% | 40.9% |

*Contains the water used for washing the residue.

As is obvious from the results hereinabove shown, the method of this invention makes it possible to concentrate silver from anode slime effectively at a high yield only by a wet process which is easy to carry out with a low thermal energy consumption. The conversion of silver to a silver anode for electrolysis requires only two or three days, as opposed to at least one to two weeks hitherto required. The expensive nitric acid solution used for nitric acid extraction can be regenerated with an inexpensive sulfuric acid solution, and recycled.

Although the invention has been described with reference to the several examples thereof, it is to be understood that modifications or variations may be easily made by anybody of ordinary skill in the art without departing from the scope of this invention which is defined by the appended claims.

What is claimed is:

1. A method of concentrating the silver in an intermediate product obtained by the treatment of anode slime generated during electrolytic copper refining, the intermediate product containing lead in sulfate form and silver in chloride form, the method comprising:
    (a) reacting the intermediate product with an aqueous solution containing a compound selected from the group consisting of alkali metal hydroxides and carbonates wherein the amount of alkali metal added is in at least the stoichiometric amount up to 1.2 times the stoichiometric amount with respect to lead to form a reaction product;
    (b) subjecting the reaction product obtained in step (a) to solid-liquid separation; and
    (c) reacting the residue obtained in step (b) with a nitric acid solution, whereby the lead therein is separated into a filtrate, while the silver remains in the residue.

2. A method as set forth in claim 1, wherein said compound is an alkali hydroxide, and wherein said intermediate product is reacted with said aqueous solution at a temperature of below 40° C.

3. A method as set forth in claim 1, wherein an alkali which is reacted with the intermediate product is added in the quantity of 1.1 to 1.2.

4. A method as set forth in claim 1, wherein the separated solution containing lead nitrate is reacted with sulfuric acid to precipitate lead sulfate and recover nitric acid so as to be recycled.

* * * * *